Dec. 5, 1950     I. D. JAGGER     2,532,404
RATCHET DRIVE
Filed Dec. 19, 1945
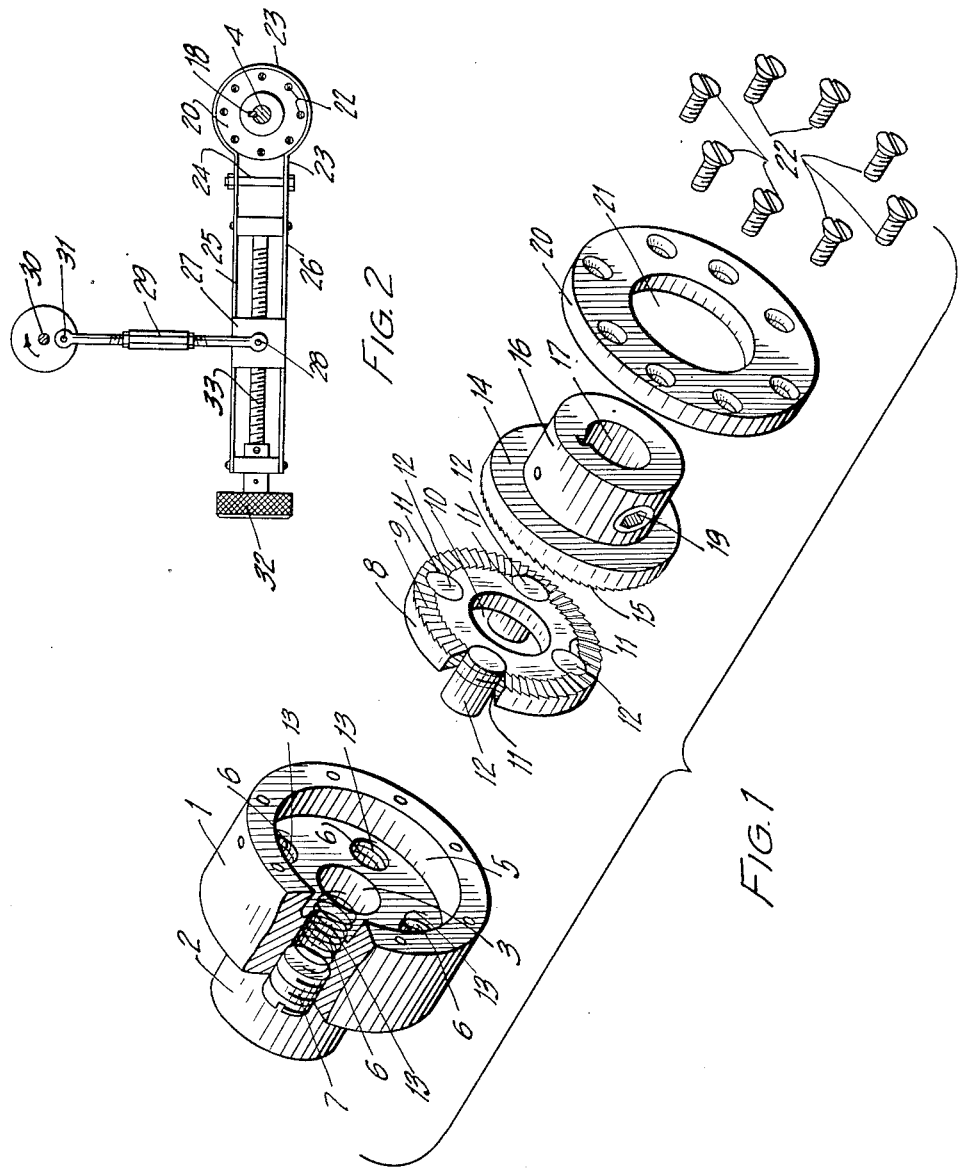
INVENTOR.
Ivan D. Jagger
BY
ATTORNEY Patented Dec. 5, 1950

2,532,404

UNITED STATES PATENT OFFICE 2,532,404

RATCHET DRIVE

Ivan D. Jagger, Albany, N. Y., assignor to Wheeler Paper Corporation, Albany, N. Y., a corporation of New York Application December 19, 1945, Serial No. 635,931

2 Claims. (Cl. 192—46)

My invention relates to improvements in clutches or ratchet driving means, and particularly to driving means of this character which, while susceptible of very fine adjustment, is capable of transmitting substantial loads.

Clutches comprising two or more elements which engage when rotated in one direction but which immediately disengage when rotated in the opposite direction are frequently employed in connection with an oscillating arm for intermittently rotating a shaft in one direction. The action of such clutches is not positive and frequently they fail properly to function. A simple ratchet wheel and pawl arrangement is also often employed for producing an intermittent rotation of a shaft but, where fine adjustment is required, the teeth on the ratchet wheel must be very small and of short pitch with the result that only small loads can be transmitted and wear on the teeth is rapid.

One of the objects of my invention is to produce a device of this character adapted to effect an intermittent rotative movement of a shaft, or the like, which is capable of very fine adjustment, and which is positive in its action. Another object is to provide a device of this character in which the cooperating surfaces through which the driving force is transmitted present, in the aggregate, a surface area of substantial magnitude so that the load per unit of area is comparatively small thereby making it possible to transmit loads of substantial magnitude by distributing the load over a multiplicity of comparatively small areas. Another object is to provide a unitary device of this character which is entirely enclosed and which is provided with means accessible from the exterior thereof for regulating the pressure with which the driving and driven elements are yieldingly held in cooperative relationship.

With these objects in view, my invention resides in the combination of elements described below and illustrated in the accompanying drawings in which—

Fig. 1 is an exploded perspective view of my device; and

Fig. 2 is a small scale side or end elevation of the device, illustrating one application thereof.

Referring to the drawings—

My device comprises a cylindrical casing 1 having a hub 2 integral therewith and which is provided with an axial bore 3 forming a bearing for a shaft 4; it being understood that the casing 1 may rotate freely on the shaft 4. The side or end of the casing opposite the hub is counterbored, as shown at 5, and circumferentially-spaced holes 6, preferably four in number, are drilled axially through the closed end of the casing about the hub. The outer portions of these holes adjacent the hub are threaded to receive screws 7.

A disc 8, which, for purposes of discussion, will be termed the driving disc, is provided on one side thereof with a multiplicity of ratchet teeth 9 extending radially inwardly from the periphery thereof and is also provided with a central aperture 10 adapted to pass freely over the shaft 4. Circumferentially spaced about the aperture 10 are four holes 11 into which are threaded studs 12 which are receivable in the holes 6 in the casing and may slide freely therein. Interposed between the studs 12 and the screws 7 are light, helical springs 13.

14 is the driven disc which is provided on the side thereof facing the driving disc with a multiplicity of ratchet teeth 15 adapted to cooperate with the teeth 9 on the disc 8. The driven disc 14 is provided with a hub 16 and the disc-hub assembly is provided with an axial bore 17 adapted to receive the shaft 4. The driven disc and its hub may be keyed to the shaft 4 as shown at 18 or secured thereto by means of a set screw 19. Thus, while the casing 1 and the driving disc are free to rotate on the shaft 4 the driven disc is secured in fixed relation thereto. The depth of the counterbore 5 in the casing 1 is slightly greater than the combined thicknesses of the discs 8 and 14, including the teeth on said discs, so that clearance is provided for axial movements of the disc 8 sufficient to effect disengagement of the cooperating ratchet teeth.

The cover plate 20, which is provided with a central aperture 21 adapted to pass the hub 16, encloses the driving and driven discs in juxtaposed relation within the casing 1, and is secured to the casing by means of the screws 22.

The springs 13 serve yieldingly to hold the teeth on the driving disc in meshed cooperative relation with the teeth on the driven disc 14, and the pressure by which the teeth are held in cooperative relation may be varied by adjusting the screws 7.

In Fig. 2, I have illustrated an application of my device to effect intermittent rotative movements of the shaft 4. The strap 23 is tightly clamped about the exterior of the casing 1 by means of the bolt 24. Within the parallel portions 25 and 26 of the strap 23 is slidably mounted a block 27 having a pin 28 thereon to which is connected the adjustable link 29. 30 is a driving shaft having the crank pin 31 thereon to which the other end of the link 29 is connected. Thus, assuming the shaft 30 to rotate in the direction of the arrow, it will be apparent that, during the upward movement of the crank pin 31, the casing and the driving disc 8 will be rotated in a clockwise direction, and, because the teeth on the discs are then in cooperative meshed relation, the disc 14 and the shaft 4 to which it is attached will also be turned in a clockwise direction. However, during the downward movement of the crank pin 31, the casing 1 will be rotated in a counterclockwise direction and the teeth on the driving disc 8 will slip past the teeth on the driven disc 14 so that, during this part of the movement of the crank pin 31, there will be no movement of the driving disc 14 and no movement of the shaft 4.

In order to adjust the extent to which the shaft 4 will be rotated during each revolution of the shaft 30, the link 29 is made adjustable and the distance of the pin 28 from the axis of the shaft 4 may also be varied by turning the adjusting knob 32 which is attached to a screw 33 threaded through the block 27. Thus, by turning the adjusting knob 32, the block 27 may be moved towards or away from the shaft 4.

The ratchet teeth, of course, may have any pitch, but, by reason of the design a very small pitch and very small teeth may be employed and are desirable. The total load transmitted by the driving element to the driven element is distributed uniformly over all of the cooperating teeth so that each tooth carries only a small proportion of the total load. By adjusting the screws 7 so that the teeth are held in yielding, cooperative relation by very light pressure, wear on the teeth is reduced to a minimum.

From the foregoing it will be apparent that I have provided a positive ratchet drive or clutch which is capable of very fine adjustment, which is absolutely positive in its action, and upon which there is very little wear.

What I claim is:

1. A unitary ratchet driving mechanism, comprising a cylindrical casing having a hub thereon adapted to receive a shaft on which said casing may be rotatably mounted and provided in the interior end wall thereof about said hub with a plurality of circumferentially spaced recesses, a first cylindrical disc in said casing provided on one side face thereof with pins slidably receivable in said recesses, whereby relative rotation of said casing and disc is prevented, and, on the other side, with a multiplicity of ratchet teeth extending radially inwardly from the periphery thereof, a second cylindrical disc in said casing coaxial with said first disc and provided with a multiplicity of similar ratchet teeth on the side thereof adjacent said first disc and adapted to cooperate with the teeth on said first disc; said second disc being provided with means adapting it to be fixed to said shaft; a cover forming the other end wall of said casing and securing said discs in said casing but providing relative axial movement of said discs to effect a disengagement of said teeth, and resilient means yielding holding said teeth in cooperative engagement.

2. The structure set forth in claim 1 together with means accessible from the exterior of said casing for adjusting said resilient means to regulate the pressure with which said teeth are held in engagement.

IVAN D. JAGGER.

REFERENCES CITED

The following references are of record in the file of this patent:

UNITED STATES PATENTS

| Number | Name | Date |
| --- | --- | --- |
| 351,735 | Brill | Nov. 2, 1886 |
| 577,490 | McGuire et al. | Feb. 23, 1897 |
| 651,706 | Forbes | June 12, 1900 |
| 832,222 | Tuttle | Oct. 2, 1906 |